(12) United States Patent
Solberg, Jr. et al.

(10) Patent No.: US 6,348,077 B1
(45) Date of Patent: Feb. 19, 2002

(54) MULTIPLE STAGE AIR-INTAKE FILTER APPARATUS

(75) Inventors: Charles Solberg, Jr., Barrington, IL (US); William Decker, Cambridge, WI (US)

(73) Assignees: Solberg Manufacturing, Inc., Itasca, IL (US); American Farm Implement & Spec., Janesville, WI (US)

( * ) Notice: Subject to any disclaimer, the term of this patent is extended or adjusted under 35 U.S.C. 154(b) by 0 days.

(21) Appl. No.: 09/450,647

(22) Filed: Nov. 19, 1999

(51) Int. Cl.[7] .................... B01D 29/56; B01D 50/00; B01D 27/06
(52) U.S. Cl. .................... 55/323; 55/337; 55/401; 55/404; 55/482; 55/521
(58) Field of Search ............... 55/320, 385.3, 55/321, 323, 337, 401, 404, 437, 438, 457, 482, 503, 521, 498

(56) References Cited

U.S. PATENT DOCUMENTS

| | | |
|---|---|---|
| 1,641,746 A | 9/1927 | Donaldson |
| 1,870,216 A | 8/1932 | Baldwin |
| 2,973,833 A | 3/1961 | Cook |
| 3,670,480 A | 6/1972 | Petersen |
| 3,973,937 A | 8/1976 | Petersen |
| 4,135,897 A | 1/1979 | Gondek |
| 4,169,059 A | 9/1979 | Storms |
| 4,201,557 A | 5/1980 | Petersen |
| 4,248,613 A * | 2/1981 | Linhart .................... 55/394 |
| 4,941,900 A * | 7/1990 | Cordes .................... 55/319 |
| 4,976,857 A | 12/1990 | Solomon |
| 5,022,903 A | 6/1991 | Decker |
| 5,059,222 A | 10/1991 | Smith |
| 5,178,760 A | 1/1993 | Solberg, Jr. |
| 5,505,756 A | 4/1996 | Decker |
| 5,656,050 A | 8/1997 | Moredock |
| 5,766,315 A | 6/1998 | Moredock |

FOREIGN PATENT DOCUMENTS

GB 2064359 * 6/1981 .................. 55/337

OTHER PUBLICATIONS

Enginaire Brochure.

* cited by examiner

Primary Examiner—Robert A. Hopkins
(74) Attorney, Agent, or Firm—Robert F. I. Conte

(57) ABSTRACT

A multiple stage air-intake filter has a first stage to pre-clean air. The air-intake filter has a second stage. Air pre-cleaned by the first stage is directed to the second stage by a fluid carrying juncture. The second stage includes a first and second filter element in series which filters air received from the first stage. The second stage has an air inlet and an air outlet. The fluid carrying juncture and the second stage air outlet are in line.

10 Claims, 4 Drawing Sheets

MULTIPLE STAGE AIR-INTAKE FILTER APPARATUS

The invention concerns a multiple stage air-intake filter apparatus which includes a porous filter element in-line with a pre-cleaner cap.

BACKGROUND OF THE INVENTION

Many machines require an air-intake filter apparatus to separate out undesirable substances before the air enters the machine. Examples of these types of filters include air-intake filters for blowers, compressors and vacuum pumps. Additionally, internal combustion engines require air-intake filters. Air-intake filters have to accomplish two opposing objectives. First, the filters need to permit high volume and high velocity uptake of air. Second, the filters need to remove unwanted substances from the uptaken air. The objective of substance removal inhibits the objective of high volume and high velocity air uptake. Industry, to balance the objectives, uses costly and complex filter elements having various combinations of material and shapes. Industry for instance, uses corrugations to increase the amount of pores available in a given area occupied by a filter media. Industry also uses multiple layer filter media.

To reduce the inconvenience and expense associated with replacing costly filter elements, it is advantageous to increase the longevity of the filter element. To increase longevity one could use a pre-cleaner. Pre-cleaners increase longevity of by removing larger contaminants from the air prior to the air's passage through the air filter media.

Literature discloses a multiple stage air-intake filter apparatus. The filter apparatus has a pre-cleaner. The pre-cleaner defines an air pathway into a cylindrical filter housing. The filter housing encloses an outside-in cylindrical filter media. The cylindrical filter housing discharges air in a pathway which is perpendicular to the air pathway leading into the cylindrical housing. It is believed the filter has problems: small particles, in an amount greater than desired, may be discharged from the cylindrical housing into the associated machine. Reducing the size of the filter pores has problems; it impedes air flow.

SUMMARY OF THE INVENTION

The present invention provides a multiple stage air-intake filter which desires to produce improved air filtration without unduly impeding airflow. The invention includes a filter having a first stage construction to pre-clean air. In the first stage construction, an air-uptake portal receives cleaned air from a first stage separation chamber. The air received by the air-uptake portal passes through a fluid carrying juncture and to a second stage. The air enters the second stage through a second stage air-inlet. The second stage contains one or more filter elements. The pre-cleaned air passes through the filter elements and exits the multiple stage filter through a second stage air-outlet. The second stage air-outlet is in-line with the air-uptake portal, the second stage air-inlet, and the fluid carrying juncture. Having the air-uptake portal, second stage air-inlet, and fluid carrying juncture, in-line with the second stage outlet, improves air flow efficiency. The efficiency of the flow increases so much that dual filter elements, having relatively smaller pores, can be used. Thus the efficiency of the filter is improved. Additionally, having the in-line arrangement allows for a compact multiple stage air filter.

In accordance with the above desire, the multiple stage air-intake filter apparatus includes a first stage housing. The first stage housing has an end wall and a sidewall. The side wall has a first end and a second end. The end wall is disposed at the first end of the sidewall. The second end of the sidewall forms a first stage opening into a first stage hollow. The hollow is formed by the sidewall and the endwall. At least one vent opens into the sidewall. A fluid carrying juncture passes air from the first stage to a second stage housing.

The second stage housing forms a second stage hollow. The second stage housing has an air-inlet opening into the second stage hollow. The second stage housing has an air outlet opening out of said second stage hollow. The second stage air inlet is downstream of the fluid carrying juncture. The second stage air-outlet is downstream of the second stage air-inlet. The first stage opening which opens into said first stage hollow; said fluid carrying junction air uptake portal; said second stage air-inlet and said second stage air-outlet are all in fluid communication. The second stage air-inlet and second stage air-outlet are oriented so that a longitudinal axis, coextensive with an axis of the second stage out-let, passes through said second stage air-inlet.

These and other features of the invention will be apparent to those skilled in the art when the specification is read in conjunction with the drawings. It being expressly understood, however, that the drawings are for purposes of illustration only and are not intended as a definition of the limits of the invention.

DETAILED DESCRIPTION

Figure 1:
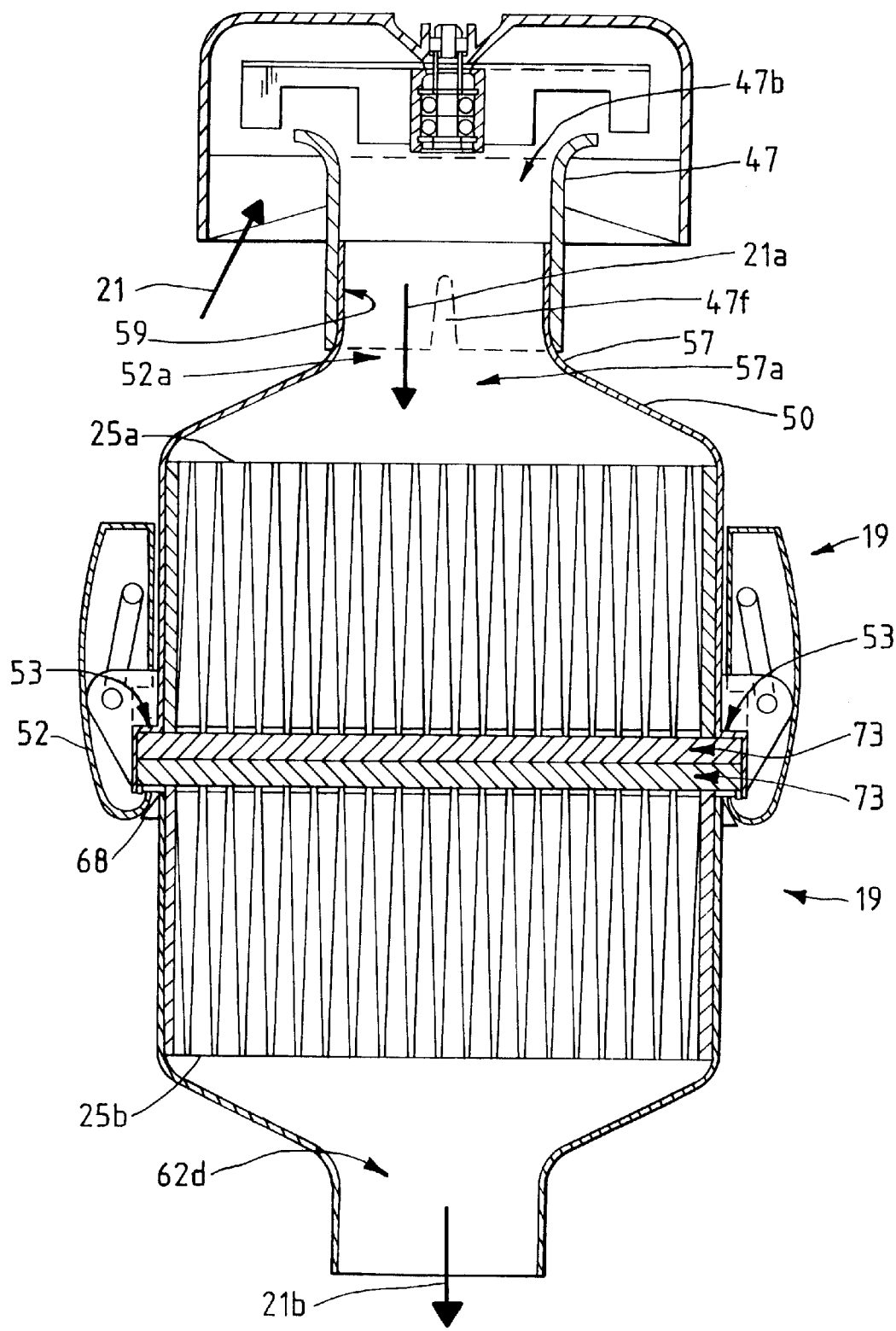
FIG. 1 is a cross sectional view of the multiple stage filter apparatus taken along the filter apparatus major axis.
Figure 2:
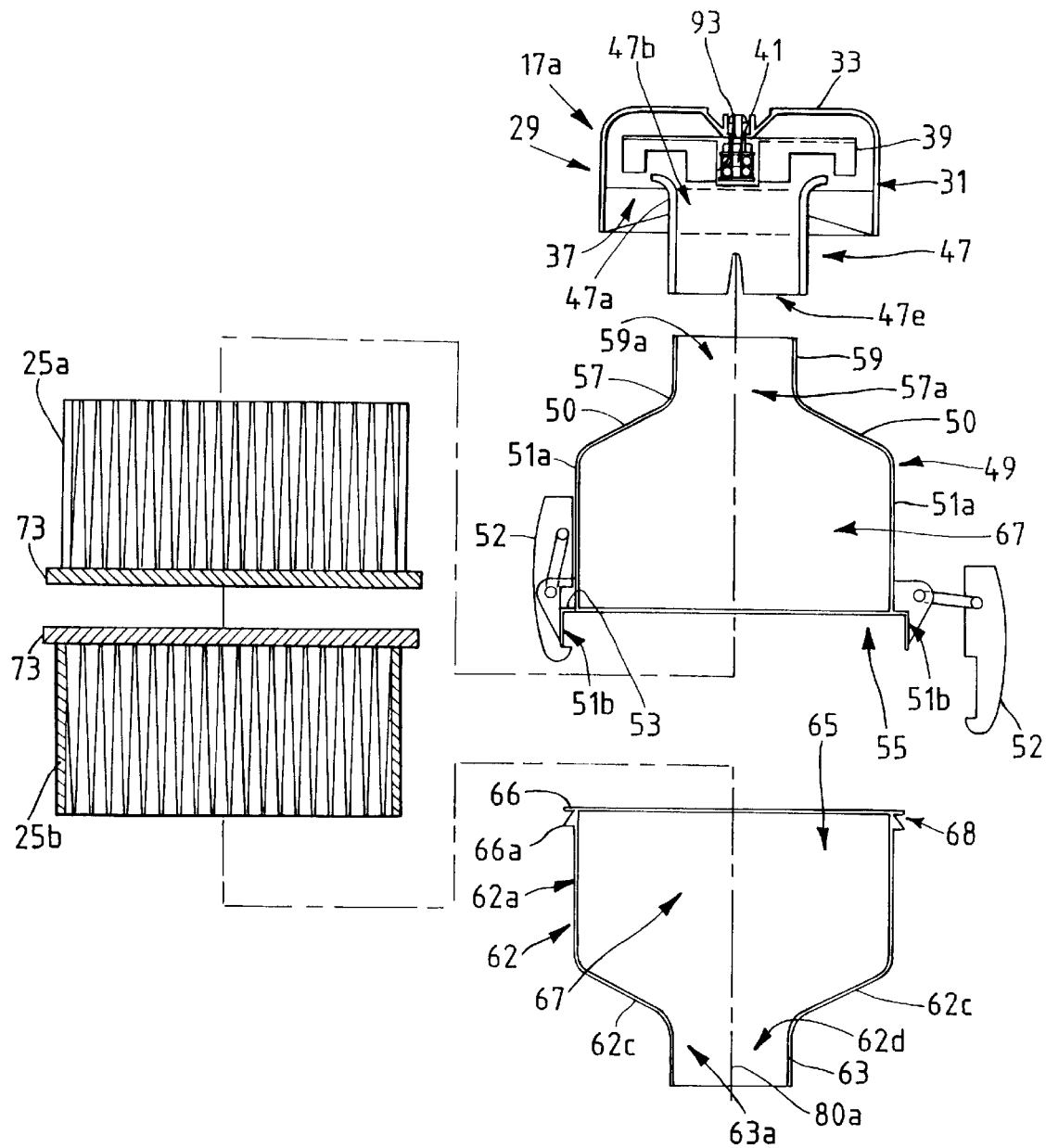
FIG. 2 is an exploded cross sectional view of the filter apparatus taken along the filter apparatus major axis.

The multiple stage air-intake filter 15 has a first stage construction 17, 17b and a second stage construction 19. The filer can generally be understood by reference to the flow of air passing through the filter. In terms of the air flow, an amount of unclean air 21 passes into the first stage construction 17, 17b. An amount of unclean air 21 is pre-cleaned by the first stage. The amount of pre-cleaned air 21a is directed into the second stage 19 by a fluid carrying juncture 47, 59. The pre-cleaned air, once in the second stage 19, passes through filter elements 25a, 25b. Air 21b once purified by the filter elements, exits the multiple stage filter apparatus through an air outlet 62d. The air 21b exits in-line with the fluid carrying juncture.

Figure 3:
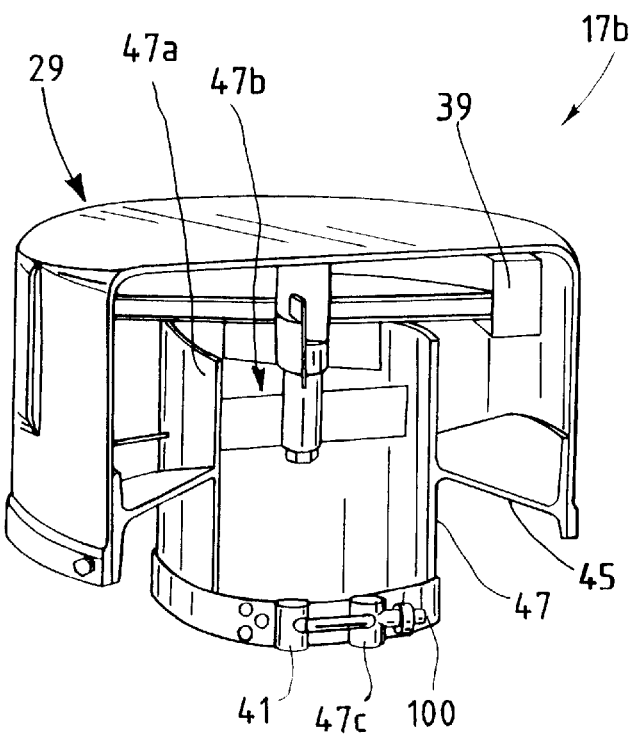
FIG. 3 is a side cut-away view of an alternative embodiment of the first stage construction of the multiple stage filter apparatus.
Figure 4:
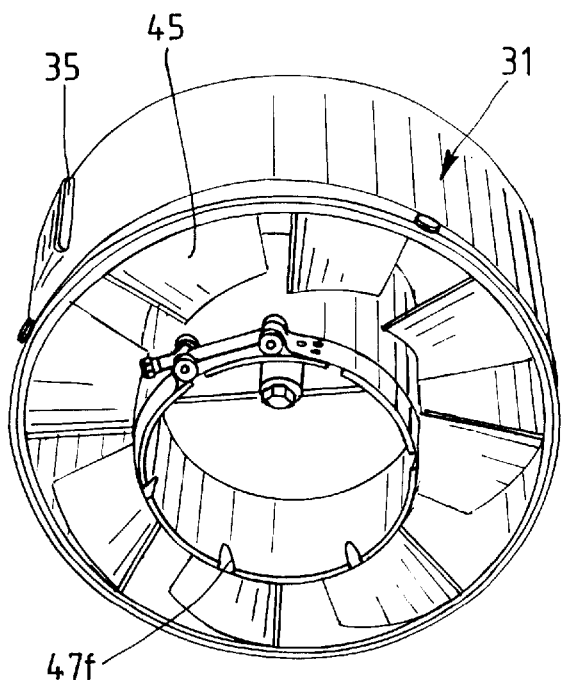
FIG. 4 is a bottom and side view of the alternative first stage construction of the multiple stage filter apparatus.
Figure 5:
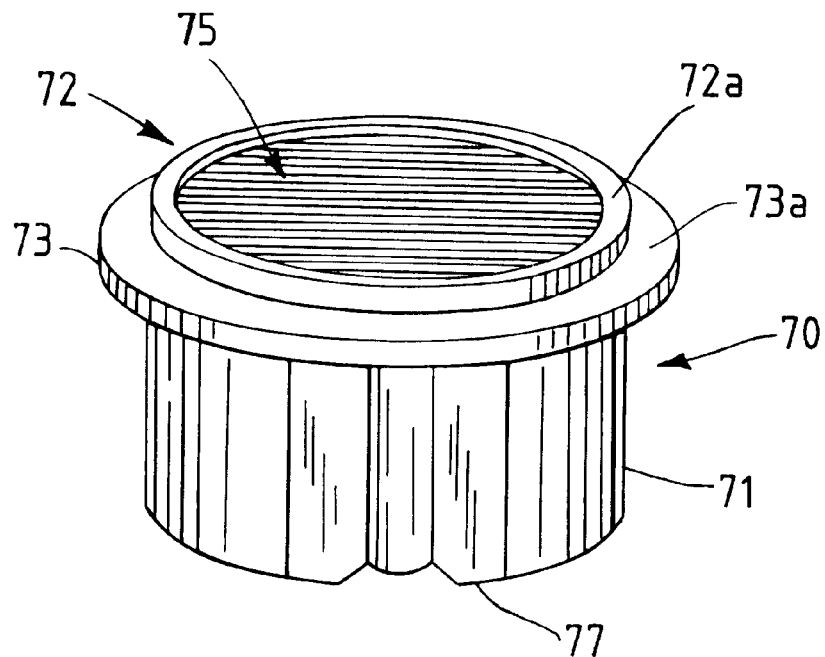
FIG. 5 is a top and side perspective view of a filter element used in the second stage construction of the multiple stage filter.
Figure 6:
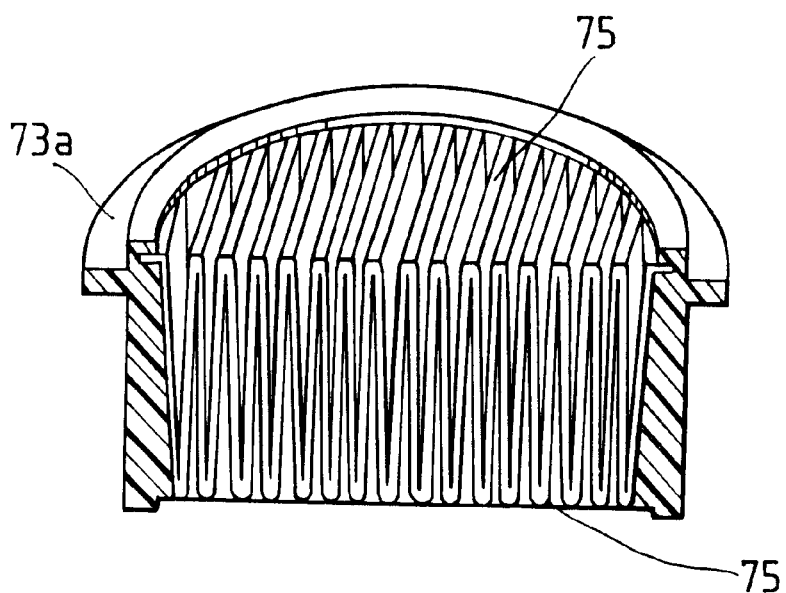
FIG. 6 is a top and side view of a cross section of the filter element shown in FIG. 6.

Referring to FIGS. 1, 2, 3 and 4, we see details of two embodiments of first stage construction, 17a, 17b. The first embodiment, FIGS. 1–2, and the second embodiment, FIGS. 3–4, are very similar. Each embodiment of the first stage construction includes a housing 29. The first stage housing 29 has a housing cylindrical sidewall 3 land a housing end wall 33. The housing sidewall 31, as can be seen in the second embodiment, has a vent 35. The first stage housing 29 has an interior surface which defines a first stage hollow 37. Disposed within the first stage hollow 37 is a rotor 39, impeller or spinner. The rotor 39 is rotatably connected to the housing end wall by an axially extending shaft. The shaft 41 is best seen in the first embodiment. The rotation can be facilitated by bearings. The bearings 43 are shown in the first embodiment. As best seen in the second embodiment, disposed within the hollow are a plurality of angled louvers 45 or vanes. A tubular member 47 is radially inward of the louvers 45. The louvers connect the tubular member 47 to the housing sidewall 31. A portion of a tubular member 47 is disposed within the first stage hollow 37. The tubular member has a first end 47a. An air-uptake portal 47b opens into the first end. The air-uptake portal 47b faces the rotor 39 and the housing endwall 33. The air-uptake portal 47b is in fluid communication with the hollow 37.

It should be noted that the difference between the first embodiment and the second embodiment includes the coupling of the rotor 39. In the second embodiment, the rotor 39 is coupled to the tubular member 47 at the tubular member first end 47a. The rotor is coupled by a strut 47c extending along an internal diameter of the tubular member. In the first embodiment, the rotor 39 is coupled to the housing endwall 33 by shaft 41.

The second stage 19, is in fluid communication with the first stage 17a, 17b. FIGS. 1, 2 and 6–8 disclose further details of the second stage construction. The second stage has a first cup shaped member 49. The first cup shaped member has a first cylindrical sidewall 51a, 51b. Clasps 52 are located on opposite exterior portions of the first sidewall 51a, 51b. The first sidewall 51a, 51b has a first portion 51a and a second portion 51b. The second portion 51b has a greater diameter than the first portion 51a. A laterally extending shoulder 53 joins the first portion to the second portion. The laterally extending shoulder and second portion forms a retaining member 51b, 53.

The first cup shaped member 49 has a tapered, domed or conically shaped end wall 50. The end wall 50 is seamless with the sidewall 51a, 51b. Located at the central portion 57 or frustrum of the end wall is the second stage air-inlet 57a. Extending away from the inlet 57a and towards the first stage is a neck 59. The neck has an open end 59a which is disposed within the tubular member 47 at the tubular member second end 47e. A portion of the sidewall 51a, 51b, opposite the portion where the sidewall 51a, 51b joins the endwall 50, defines a mouth 55. The second stage air-inlet 57a, neck open end 59a and air-uptake portal 47b are all in line and in fluid communication.

The neck 59 and the tubular member 47 form the fluid carrying juncture 47, 59. To help secure the tubular member to the neck, a band clamp 100, FIGS. 3 and 4, can be used. The band clamp compresses the tubular member 47 around the neck. To facilitate compression of the tubular member, slots 47f are disposed in the tubular member.

The second stage includes a second cup shaped member 62 similar to the first cup shaped member. The second cup shaped member 62 has a cylindrical sidewall 62a. The second cup shaped member has a tapered, domed or conically shaped end wall 62c. The end wall has a second stage air outlet an outlet 62d through which the air is discharged. The outlet 62d leads into a neck 63. The neck 63 has an open end 63a which interfaces with a machines air intake pipe. The second cup member at its mouth 65 has a lip portion 66. The lip portion 66 and an associated nub 66a, form a notch 68 for clasp 52. The first cup member and the second cup member are joined at their mouths by connection of the clasps 52 to the notches 68. The first cup member and the second cup member, once joined form a second stage housing 49, 62 which has an internal surface which forms a second stage hollow 67.

The first 25a and second filter element 25b are disposed within the second stage hollow 67. The first and second elements are identical and oppositely oriented. Each element has a cartridge 70. The cartridge 70 has a tubular body 71. The tubular body at a first end 72 has first end wall 72a which defines an opening at the first end 72. A circular ledge 73 extends coenctrically around the tubular body. The ledge 73 has a surface 73a. The ledge surface 73a of filter element 25b, faces the second stage air-inlet 57a. Ledge surface 73a is slightly spaced from the tubular body first endwall 72a.

A disk like corrugated filter media 75 is disposed within each tubular body at the tubular body first end 72 and slightly spaced from the first endwall 72a. The filter elements are oriented in the second stage hollow 67 so that an open end 77, opposite the first end 72, of each cartridge, faces away from each other; and the filter bearing end 72, of each cartridge, faces towards each other. The filter cartridge ledges 73 are disposed within the retaining member 51b, 53 of the first cup shaped member.

In the present invention, the fluid carrying juncture air-uptake portal 47a, the tubular member 47, the neck 59 extending from the first cup member 49, the fluid juncture 47, 59, the second stage air-inlet 57a, and the second stage air-outlet 62d share the same axis 80. The axis 80 is thus, of course, coextensive with the second stage outlet axis 80a. Alternatively, the axis 80 should at least pass through the tubular member, the second stage air-inlet, the first stage air-inlet portal, the first cup member neck and/or the fluid juncture.

Having described the components of the invention, the air flow associated with the filter can now be described in more detail. The unclean air 21 enters the first stage hollow through a first stage housing open end 100. The air passes through the louvers 45, FIGS. 3–4, and through the rotor 39. As the air passes through the first stage hollow 37 (a separation chamber) the louvers 45 and rotor 39 separate the particles from the air. The particles discharge through the sidewall vent 35, FIGS. 3–4. An amount of air 21a now pre-cleaned, passes into the air-uptake portal 47b, and into a fluid carrying chamber defined by the fluid carrying juncture 47, 59. Next, the air passes through the second stage air inlet 57a, through the filter elements 25a, 25b, and out the second stage outlet 62d.

Other embodiments of the present invention as well as mechanical equivalents will be apparent to those skilled in the art and it is not the intention of the specification to limit the scope of the invention but rather to provide an example of an embodiment of the invention.

What is claimed:

1. A multiple stage air-intake filter apparatus comprising:
    a first stage housing, said first stage housing having an end wall and a sidewall, said side wall having a first end and a second end, said end wall disposed at said first end of said sidewall, said second end of said sidewall forming a first stage opening into a first stage hollow, said hollow formed by said sidewall and said endwall;
    at least one vent opening into said sidewall;
    a fluid carrying juncture, said fluid carrying juncture having an end which forms an air-uptake portal, said air uptake portal between said housing endwall and said second end of said sidewall;

a second stage housing, said second stage housing forms a second stage hollow, said second stage housing has an air-inlet opening into said second stage hollow, said second stage housing has an air outlet opening out of said second stage hollow, said second stage air-inlet downstream of said air-uptake portal, said second stage air-outlet downstream of said second stage air-inlet;

a first filter element disposed in said second stage hollow said first filter element having a filter media and filter cartridge;

a second filter element disposed in said second stage hollow, said second filter element having a filter media and filter cartridge, said second filter element in series with said first filter element, and wherein:

said first stage opening, said air-uptake portal of said fluid carrying juncture, said second stage air-inlet and said second stage air outlet are all in fluid communication;

said second stage air-inlet and second stage air-outlet are oriented so that a longitudinal axis coextensive with an axis of said second stage air-outlet, passes through said second stage air-inlet.

2. The multiple stage air intake filter of claim 1 wherein the fluid carrying juncture is tubular and wherein a portion of said fluid carrying juncture is made up of a tubular member fixedly coupled to said first stage housing;

another portion of said tubular junction is made from a neck, said neck extends away from said second stage air inlet and towards said first stage housing endwall, said neck portion removably coupled to said tubular member.

3. The multiple stage air-intake filter of claim 2 further comprising:

a rotor disposed within said first stage hollow.

4. The multiple stage air intake filter of claim 3 further comprising at least a portion of one louver disposed within said first stage hollow.

5. The multiple stage air-intake filter apparatus of claim 1 wherein;

said first filter element and said second filter element are equal in size.

6. A multiple stage air-intake filter apparatus comprising:

a first stage housing, said first stage housing having an end wall and a sidewall, said side wall having a first end and a second end, said end wall disposed at said first end of said sidewall, said second end of said sidewall forming a first stage opening into a first stage hollow, said hollow formed by said sidewall and said endwall;

at least one vent opening into said sidewall;

a fluid carrying juncture, said fluid carrying juncture having an end which forms an air-uptake portal, said air uptake portal between said housing endwall and said second end of said sidewall;

a second stage housing, said second stage housing forms a second stage hollow, said second stage housing has an air-inlet opening into said second stage hollow, said second stage housing has an air outlet opening out of said second stage hollow, said second stage air-inlet downstream of said air-uptake portal, said second stage air-outlet downstream of said second stage air-inlet;

a first filter element disposed in said second stage hollow said first filter element has a first filter media disposed in a first filter cartridge, said first cartridge includes a first tubular body, said first tubular body having a first end and a second end, said first filter media of said first filter element disposed in said first tubular body;

a second filter element, said second filter element having a second filter media and a second filter cartridge, the second cartridge includes a second tubular body, said second tubular body having a first end and a second end, said second filter media disposed in said second tubular body, said first element and said second element in series;

said first stage opening, said air-uptake portal of said fluid carrying juncture, said second stage air-inlet and said second stage air outlet are all in fluid communication;

said second stage air-inlet and second stage air-outlet are oriented so that a longitudinal axis coextensive with an axis of said second stage air-outlet, passes through said second stage air-inlet, wherein the air-uptake portal is oriented so that said axis co-extensive passes into said air-uptake portal, wherein said first stage housing sidewall is cylindrical, wherein the fluid carrying juncture is tubular and wherein a portion of said fluid carrying juncture is made up of a tubular member fixedly coupled to said first stage housing and wherein;

another portion of said tubular junction is made from a neck, said neck extends away from said second stage air inlet and towards said first stage housing endwall, said neck portion removably coupled to said tubular member.

7. The multiple stage air intake filter apparatus of claim 6 wherein the filter elements are oriented so that the first ends of each tubular body face each other, and said second ends of said tubular bodies face away from each other.

8. The multiple stage air intake filter of claim 6 wherein;

said tubular member has an open end opposite the air uptake portal, a slot extends longitudinally from said tubular member open end opposite the air uptake portal, said slot extends towards said air uptake portal, said slot has a longitudinal length at least ½ the longitudinal length of the neck;

said neck has an open end, said neck open end extends into said tubular member less than ⅔rds of a longitudinal length of said tubular member, said neck open end and said second end of said first stage housing side wall lie substantially within the same plane.

9. The multiple stage air intake filter of claim 6 wherein said tubular member has an open end opposite the air uptake portal, a slot extends longitudinally from said tubular member open end opposite said air uptake portal, said slot extends towards said air uptake portal, said slot has a longitudinal length at least ½ the longitudinal length of the neck;

said neck has an open end, said neck open end extends into said tubular member less than ⅔rds of a longitudinal length of said tubular member, said neck open end and said second end of said first stage housing side wall lie substantially within the same plane.

10. A multiple stage air-intake filter apparatus comprising:

a first stage housing, said first stage housing having an end wall and a sidewall, said side wall having a first end and a second end, said end wall disposed at said first end of said sidewall, said second end of said sidewall forming a first stage opening into a first stage hollow, said hollow formed by said sidewall and said endwall;

at least one vent opening into said sidewall;

a fluid carrying juncture, said fluid carrying juncture having an end which forms an air-uptake portal, said air uptake portal between said housing endwall and said second end of said sidewall;

a second stage housing, said second stage housing forms a second stage hollow, said second stage housing has an air-inlet opening into said second stage hollow, said second stage housing has an air outlet opening out of said second stage hollow, said second stage air-inlet downstream of said air-uptake portal, said second stage air-outlet downstream of said second stage air-inlet;

a first filter element disposed in said second stage hollow;

a second filter element disposed- in said second stage hollow, said second filter element and first filter element are axially in series along an axis, said axis extending along a length of said second stage housing;

said first stage opening, said air-uptake portal of said fluid carrying juncture, said second stage air-inlet and said second stage air outlet are all in fluid communication;

said second stage air-inlet and second stage air-outlet are oriented so that a longitudinal axis coextensive with an axis of said second stage air-outlet, passes through said second stage air-inlet.

* * * * *